Aug. 1, 1939.  H. P. GROHN  2,167,749
OVERLOAD CLUTCH
Filed May 31, 1938  2 Sheets-Sheet 1
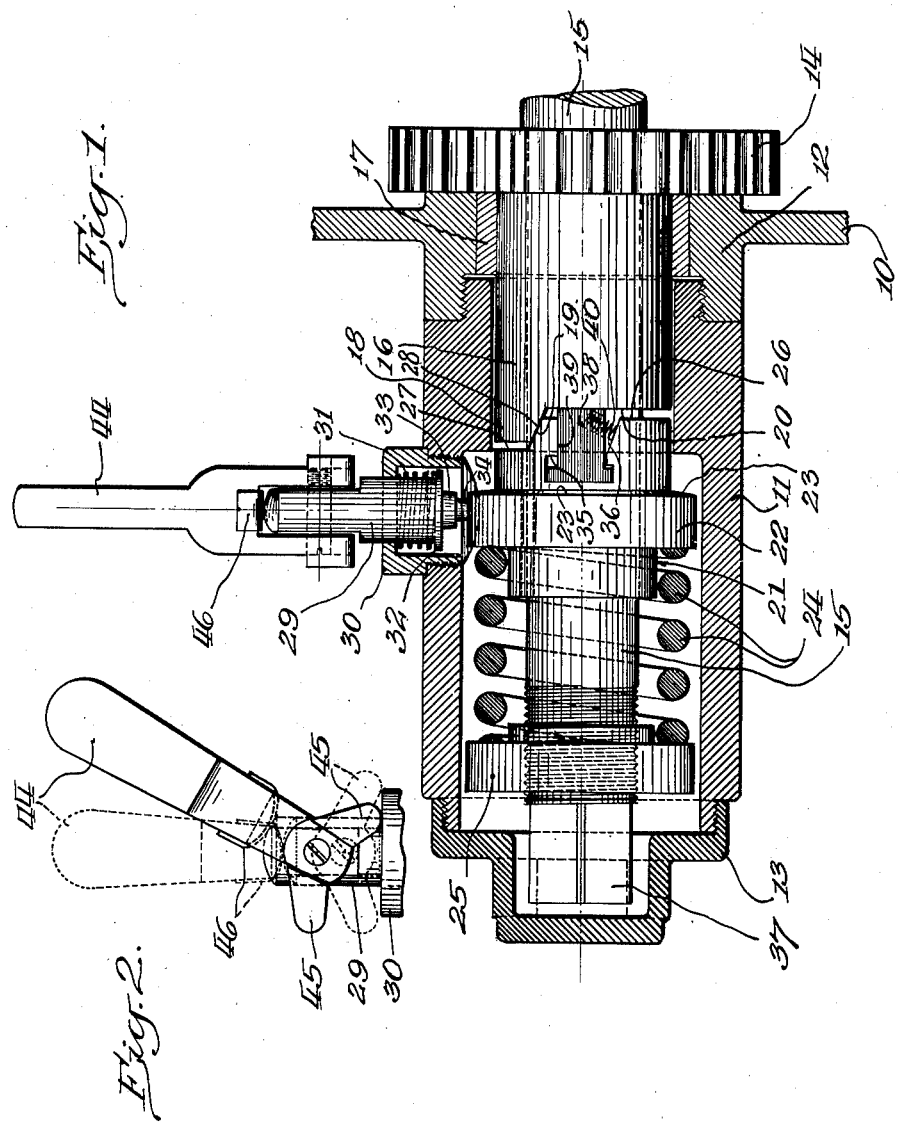
INVENTOR.
Henry P. Grohn
BY
Williams, Bradbury, McCaleb & Hinkle
ATTORNEYS.

Aug. 1, 1939. H. P. GROHN 2,167,749
OVERLOAD CLUTCH
Filed May 31, 1938 2 Sheets-Sheet 2
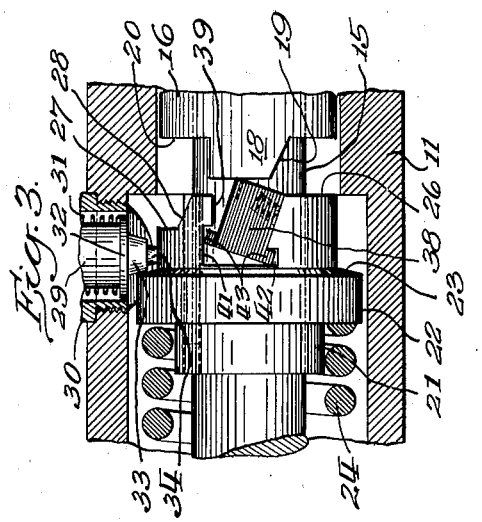
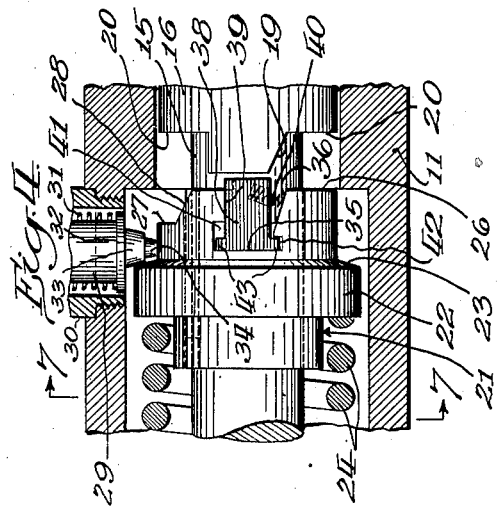
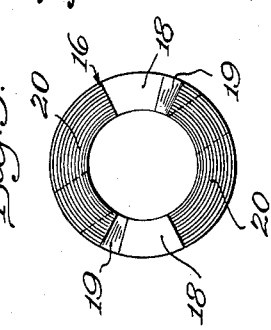
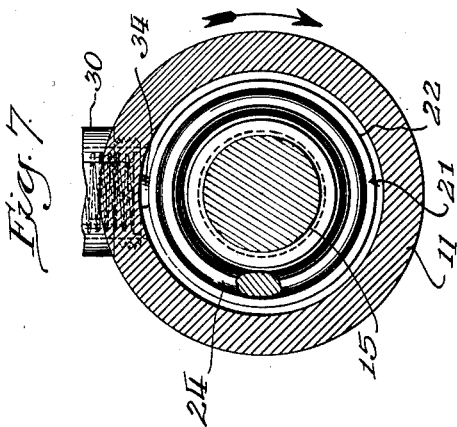
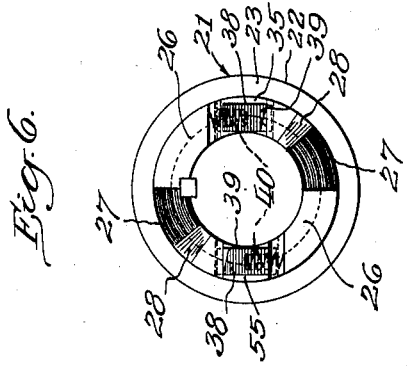
INVENTOR.
Henry P. Grohn
BY
Williams, Bradbury, McCabe & Hinkle
ATTORNEYS.

Patented Aug. 1, 1939

2,167,749

UNITED STATES PATENT OFFICE 2,167,749

OVERLOAD CLUTCH

Henry P. Grohn, Chicago, Ill.

Application May 31, 1938, Serial No. 210,931

7 Claims. (Cl. 192—56)

This invention relates to overload clutches and has for its principal object to provide an overload clutch which is adapted to operate with a predetermined load and which is adapted to automatically become disconnected when subjected to an excessive load.

One of the objects of the invention is to provide an improved overload clutch in which the clutch elements are completely separated when the device declutches on overload.

A further object of the invention is to provide an overload clutch of this type which may very readily be reset for the resumption of operation, after the condition which caused the overload has been corrected.

A further object of the invention is to provide an overload clutch of this type which is capable of being very easily fabricated and assembled, and one which may be built in various sizes for the purpose of use with machines of all degrees of power.

Other objects, advantages, and capabilities of the invention will appear from the following description of a preferred embodiment thereof, taken in conjunction with the accompanying drawings, in which:

Figure 1 is a longitudinal section through a clutch embodying my invention;

Fig. 2 is a fragmentary detail showing the manner in which the clutch is reset;

Fig. 3 is a fragmentary view corresponding to Fig. 1, showing the manner in which the clutching elements are separated on overload;

Fig. 4 is a similar view, showing the relation of the clutching elements when the clutch is open;

Fig. 5 is a face view of one of the clutching elements, being the driving clutching element;

Fig. 6 is a similar view of the other or driven clutching element, and

Fig. 7 is a sectional detail view, taken on the line 7—7 of Fig. 4.

Referring to the drawings, the reference numeral 10 designates the wall of a gear box or other portion of a machine which is equipped with the improved clutch. For the ease of adjustment and repair, the improved clutch is located in a tubular housing 11 which is threadedly mounted in a boss 12 so that the housing 11 is supported on the outside of the machine. The housing 11 is closed at its outer end by a cap 13 which may readily be removed for adjustment and repair, and particularly for regulating the degree of overload at which the clutch automatically opens.

In this embodiment of the invention the gear or ratchet 14 may be regarded as the driving member, the driven member being the shaft 15. It will, of course, be understood that the invention is not intended to be limited to these particular driving and driven elements, since my device is capable of being applied to all kinds of machinery.

The ratchet 14 is rigidly secured to a sleeve 16 which is rotatably mounted in a suitable bushing 17 located in the boss 12. The sleeve 16 extends into the housing 11, as best seen in Fig. 1, and its outer end, that is, the end remote from the ratchet wheel 14, is provided with two opposite tooth portions 18, each of which occupies somewhat less than one-quarter of its circumference. One side 19 of each tooth 18, that is, the driving side, is cut at a slope relative to the axial direction, as best seen in Fig. 3. The angle which this slope makes with the axial direction is not critical, but it may be of the order of 30 degrees. Between the teeth 18, the sleeve 16 is provided with relatively large recesses 20.

The complementary clutching element 21 is in the form of a sleeve mounted on the shaft 15. This element is keyed to the shaft so that it may slide longitudinally thereon while rotating with the shaft 15. The sleeve 21 is provided with an annular projection or rib 22. The face 23 of the rib, which is directed towards the sleeve 16, is preferably slightly beveled. The opposite face of the rib 22 serves as an abutment for a helical spring 24 which is located around the outer portion of the shaft 15.

The outer end of the spring 24 rests upon a nut 25 which is threadedly mounted on the shaft 15, this nut being available for adjustment when the cap 13 is removed from the housing 11. This adjustment may be effected by a suitable wrench. The face of the sleeve 21 which is adjacent the sleeve 16 is provided with opposite tooth portions 26 and with opposite recesses 27 which are complementary to the recesses 20 and the teeth 18, respectively. During normal driving operation the teeth 18 are located in the recesses 27 and the teeth 26 are located in the recesses 20. The teeth 26 have their surfaces 28, that is, the surfaces which are located adjacent the faces 19 of the teeth 18, sloped to the same extent, as best seen in Fig. 1. The drive is communicated from the sleeve 16 to the sleeve 21 by means of these coacting faces. It will readily be understood that when the sleeve 16 is rotating in counter-clockwise direction, as viewed from the right in Fig. 1, the slope of the faces 19 and 28 is such that the sleeve 21 tends to move away from the sleeve 16.

This movement is effectively prevented under normal conditions by the spring 24, with the result that the sleeve 21 remains in the relative position shown in Fig. 1 and is driven by the sleeve 16.

The result of this drive is, of course, the driving of the shaft 15 upon which the sleeve 21 is keyed. When, however, the shaft 15 is overloaded, the thrust applied between the sloping surfaces 19 and 28 is sufficient to move the sleeve 21 axially against the compressive action of the spring 24. Consequently, the outer faces of the teeth 18 come into contact with the outer faces of the teeth 26 and the drive is terminated.

Means are provided whereby the teeth 26 are prevented from dropping into the recesses 28 as the sleeve 16 continues to rotate. For this purpose I slidably mount a plunger 29 in a cap 30 which is threadedly mounted in an opening in the wall of the housing 11 adjacent the normal location of the annular rib 22. The plunger 29 is biased inwardly by a spring 31 which bears against the interior of the cap 30 and against a bead 32 near the inner end of the plunger. At the inner extremity the plunger 29 carries a stepped projection including a frustro-conical portion 33 immediately adjacent the bead 32 and a smaller central projection 34 at the innermost end of the plunger 29. The innermost projection 34 normally bears against the surface of the annular rib 22. When the sleeve 21 is displaced on overload in the manner described, the annular rib 22 is moved clear of the projection 34 so that the same may drop inwardly over the surface 23 thereof. It is to be noted that this relation would not maintain the two elements 16 and 21 in completely separated relation since the teeth 26 and 18 would contact as the sleeve 16 continued to rotate.

It may here be noted that the present embodiment of the invention is more particularly intended for intermittent drive, as where the ratchet 14 it driven step by step by means of a tooth or pawl (not shown). Consequently, it is preferred to provide the outer end of the shaft 15 with a square nut 37 which is adapted to be held by a wrench when the nut 25 is being actuated to adjust the compression of the spring 24 which, in turn, determines the degree of load at which the clutch will become disengaged.

For the same reason I provide the stepped stop members 33 and 34. Thus, if the ratchet wheel 14 is being moved one tooth at a time, then, when the shaft 15 is held stationary by an obstruction or overload, the one-step movement of the ratchet 14 may not be sufficient to completely separate the surfaces 19 and 28 of the clutch elements. Consequently, the ratchet wheel 14 might back up and the sleeve 21 might simply move back to its original position. This is prevented by the stepped stop member 33, 34, because the smaller stop is arranged to engage the rib 22 and prevent the full return of the sleeve 21.

During the next movement of the ratchet wheel 14, the sleeve 21 is moved to the left, as viewed in Fig. 1, until the faces 20 and 27 of the clutch elements are brought into abutting relation. The action of means which will now be described continues the displacement of the sleeve 21 to the left until the stop element 33 is enabled to move into its position as shown in Figs. 3 and 4, in which position the clutch elements are completely separated.

The complete separation of the clutch elements is effected by means of tilting dogs 38 which, as seen in Figs. 1, 3 and 4, are located in opposite recesses 35 provided in the teeth of one of the clutch elements. In the embodiment of the invention illustrated, the recesses 35 are provided in the teeth 26 of the sleeve 21. The recess 35 is provided with a sloping or flaring face 36 and a face 39 which is preferably parallel to the axis of the shaft 15. Consequently, the dog 38 may move between its positions shown in Figs. 4 and 3, but it is normally biased towards the position in Fig. 4 by means of a spring 40.

The lower end of the recess 35 is provided with lateral recesses 41 and 42 which receive lateral lugs 43 at the outer end of the dog 38. It will be noted that the recess 41, which is adjacent the face 39 of the recess 35, is relatively large to permit the displacement of the dog 38 into its position as shown in Fig. 3. The dog 38 is of sufficient length that it projects beyond the surface of the teeth 26.

When a condition of overload is reached the outer faces of the teeth 26 come into contact with the outer faces of the teeth 18. Continued rotation of the clutch member 16 brings the sloping faces 19 thereof into engagement with the upper ends of the dogs 38. The result is that the dogs 38 are tilted into the position shown in Fig. 3 and continued rotation of the clutch member 16 causes the sloping faces 19 to ride upwardly over the tilted dogs. The result is that the sleeve 21 is displaced downwardly, as viewed in Fig. 1, to an extent which brings the sleeve 21 into its position shown in Fig. 4, that is, a position in which the sleeve 21 and the dogs 38 are completely separated from the clutch member 16. The sleeve 21 is held in that position by the stop member 33 which is caused to drop into the position shown in Figs. 3 and 4 by the spring 31. The spring 40 causes the dog 38 to return from its position shown in Fig. 3 to its position shown in Fig. 4.

When the obstruction or condition which caused the overload of the shaft 15 has been removed or remedied, the stop members 33 and 34 are withdrawn and the sleeve 21 is allowed to move back to its operative position. In order to bring the teeth 18 and 26 into operative relation, it may be necesary to hold the stop elements 33 and 34 out for an instant. The means by which the clutch may be reset may comprise a lever 44 which is pivotally mounted on the outer end of the plunger 29. The lever 44 rigidly carries one or more lateral projections 45 which are adapted forcibly to engage the cap 30 when the lever is displaced towards one side.

As best seen in Fig. 1, the plunger 29 has an outward position during normal operation. When the clutch becomes completely disengaged, as shown in Fig. 4, the plunger moves inwardly, carrying the handle 44 inwardly into the position shown in dotted lines in Fig. 2. It will readily be understood from this figure that when the lever 44 is displaced to one side, one of the projections 45 engages the cap 30 and the plunger 29 is drawn outwardly into the position shown in Fig. 1. When this is done for an instant, the clutch reengages.

I prefer to provide a resilient member 46 on the lever 44, which resilient member is adapted to engage the outer end of the plunger 29. Consequently, the handle 44 tends to remain in the position in which it is placed. It will, however, be understood that when the sleeve 21 is moved outwardly, the plunger 29 is free to move inwardly under the action of the spring 31 so as to lock the clutch in disengaged relation. This inward movement of the plunger 29 brings the handle 44 into the dotted line position shown in Fig. 2.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. An overload clutch comprising clutch members having engaging faces in sloping relation to the driving direction whereby excessive load tends to separate the members, resilient means tending to prevent such separation, a movable element on one of said members adapted to be displaced by the other member to effect a further separation of said members, means for holding said members in completely separated relation, and means for returning said element out of contact with said other member.

2. An overload clutch comprising clutch members having engaging faces in sloping relation to the driving direction whereby excessive load tends to separate the members, a dog tiltably carried by one member and adapted to be displaced by the other member after such separation whereby to effect a further separation of said members, resilient means tending to prevent the separation of said members, latch means for releasably holding said members in separated relation, and spring means for returning said element to non-tilted position out of contact with said other element.

3. An overload clutch comprising clutch members having interengaging teeth, said teeth having sloped faces whereby excessive load tends to cause separation of the members, yielding means opposing such separation, a tilting dog in one member and projecting beyond the member carrying it to enable it to be engaged and tilted by the other member when the members are separated, the tilting of said dog being adapted to effect a further separation of the members, means for holding said members completely separated and out of contact, and means for returning said dog to non-tilted position and out of contact with said other member.

4. An overload clutch comprising a pair of sleeves having interengaging teeth, said teeth having sloped faces whereby excessive load tends to cause the sleeves to separate, yielding means holding said sleeves in engagement, one of the teeth of one member having a recess, a dog in said recess adapted for limited tilting movement therein, a spring tending to hold said dog in untilted position, said dog being adapted to project beyond the tooth in which it is located and being adapted to project to a greater degree when tilted, whereby on overload the teeth of the sleeves are separated and a tooth of the other sleeve engages and tilts the dog to effect complete separation, and means for holding said sleeves in completely separated relation.

5. An overload clutch comprising clutch members having engaging faces in sloping relation to the driving direction whereby excessive load tends to separate the members, resilient means tending to prevent such separation, a movable element on one of said members adapted to be displaced by the other member to effect a further separation of said members, a plunger for holding said members in completely separated relation, and means for returning said element out of contact with said other member.

6. An overload clutch comprising clutch members having engaging faces in sloping relation to the driving direction whereby excessive load tends to separate the members, resilient means tending to prevent such separation, a movable element on one of said members adapted to be displaced by the other member to effect a further separation of said members, a plunger for holding said members in completely separated relation, a lever mounted at the outer end of said plunger for effecting withdrawal of the plunger, and means for returning said element out of contact with said other member.

7. An overload clutch comprising a pair of sleeve-like clutch members adapted to abut, the abutting ends being provided with interengaging teeth, a spring forcing one member into engagement with the other member, adjacent faces of said teeth being sloped relative to the axial direction of the members, a movable element carried by one of said teeth and normally projecting beyond the tooth carrying it and being adapted to be tilted so as to increase the degree of its projection relative to the tooth carrying it, and means for returning the element to non-tilted position, whereby the teeth separate on overload and the projecting element is tilted by the other member to increase the separation thereof, and a latch arranged to hold said members in a state of maximum separation.

HENRY P. GROHN.